United States Patent
Ozturk (10) Patent No.: US 10,860,388 B1
(45) Date of Patent: Dec. 8, 2020

(54) LOCK MANAGEMENT FOR MEMORY SUBSYSTEMS

(71) Applicant: Micron Technology, Inc., Boise, ID (US)

(72) Inventor: Ayberk Ozturk, Irvine, CA (US)

(73) Assignee: MICRON TECHNOLOGY, INC., Boise, ID (US)

( * ) Notice: Subject to any disclaimer, the term of this patent is extended or adjusted under 35 U.S.C. 154(b) by 0 days.

(21) Appl. No.: 16/506,875

(22) Filed: Jul. 9, 2019

(51) Int. Cl.
*G06F 9/52* (2006.01)
*G06F 3/06* (2006.01)

(52) U.S. Cl.
CPC ............ *G06F 9/52* (2013.01); *G06F 3/0604* (2013.01); *G06F 3/0659* (2013.01); *G06F 3/0673* (2013.01)

(58) Field of Classification Search
CPC ............ G06F 9/30087; G06F 12/0862; G06F 12/0875; G06F 3/0659; G06F 12/14
See application file for complete search history.

(56) References Cited

U.S. PATENT DOCUMENTS

| | | | |
|---|---|---|---|
| 5,867,686 A * | 2/1999 | Conner | G06F 9/52 707/999.008 |
| 2008/0126641 A1 * | 5/2008 | Irish | G06F 13/1631 710/112 |
| 2009/0100201 A1 * | 4/2009 | Moch | H04L 1/24 710/34 |
| 2014/0181341 A1 * | 6/2014 | Vantrease | G06F 9/52 710/200 |
| 2015/0149724 A1 * | 5/2015 | Fujisawa | G06F 9/30087 711/123 |
| 2015/0234746 A1 * | 8/2015 | Jo | G06F 12/0246 711/103 |
| 2018/0314462 A1 | 11/2018 | Katayama | |
| 2018/0336035 A1 | 11/2018 | Choi et al. | |

FOREIGN PATENT DOCUMENTS

| | | |
|---|---|---|
| CN | 108628761 A | 10/2018 |
| CN | 109739443 A | 5/2019 |
| EP | 0483250 B1 | 9/1994 |

OTHER PUBLICATIONS

International Search Report and Written Opinion, PCT App. No. PCT/US2020/039396, dated Oct. 15, 2020, 8 pages.

* cited by examiner

*Primary Examiner* — Getente A Yimer
(74) *Attorney, Agent, or Firm* — Nicholson De Vos Webster & Elliott LLP (57) ABSTRACT

A processing device receives a command from to execute a read operation. The processing device determines a memory component of media where the read operation will be executed using an address included with the read operation. The processing device determines that there is a read lock on the memory component. The processing device determines that a count of read operations dependent on the read lock has reached a read threshold. Based on this determination, the processing device adds the read operation to a read lock queue. The processing device executes a write operation prior to the read operation as a consequence of adding the read operation to the read lock queue.

17 Claims, 6 Drawing Sheets

FIG. 1

| DIE IDENTIFIER | READ LOCK | WRITE LOCK | READ LOCK COUNT |
|---|---|---|---|
| 1 | Y | N | 2 |
| 2 | N | N | 3 |
| 3 | N | Y | 1 |

LOCK MANAGEMENT FOR MEMORY SUBSYSTEMS

TECHNICAL FIELD

The present disclosure generally relates to memory subsystems and, more specifically, relates to improving the component lock management of memory systems.

BACKGROUND ART

A memory sub-system can be a storage system, such as a solid-state drive (SSD), or a hard disk drive (HDD). A memory sub-system can be a memory module, such as a dual in-line memory module (DIMM), a small outline DIMM (SO-DIMM), or a non-volatile dual in-line memory module (NVDIMM). A memory sub-system can include one or more memory components that store data. The memory components can be, for example, non-volatile memory components and volatile memory components. In general, a host system can utilize a memory subsystem to store data at the memory components and to retrieve data from the memory components.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to improving the performance of a memory subsystem. An example of a memory subsystem is a storage system or device, such as a solid-state drive (SSD). In some embodiments, the memory subsystem is a hybrid memory/storage subsystem. In general, a host system can utilize a memory subsystem that includes one or more memory components. The host system can provide data to be stored at the memory subsystem and can request data to be retrieved from the memory subsystem.

Latency can significantly impact the performance of a memory subsystem. For example, there is an impact on latency when read operations collide with write or erase operations. As write length increases, so does the time one or more components of the memory subsystem are locked, preventing read operations. With a mixed workload (e.g., multiple intervening read and write commands received from multiple host systems) and an active garbage collection process, there is a higher chance of read operations colliding with write operations, especially when writes are segmented across many blocks in the memory subsystem to optimize bandwidth. As a result, meeting quality of service (QoS) requirements for a memory subsystem is difficult. As described herein, the QoS requirements for a memory subsystem refer to, e.g., thresholds for latency (response time) and/or input/output operations per second (IOPS) while servicing a read/write workload.

Aspects of the present disclosure address the above and other deficiencies by locking a memory component when a read operation is received at the memory component. The locking of a memory component to execute a read operation can ensure that an intervening write operation, which can potentially arrive or be triggered by garbage collection in the duration between the receipt of a read command and its execution at the memory component (e.g., 2-3 microseconds), is not given undue priority and/or does not delay the execution of the read operation. This reduces the overall read latencies experienced by the memory subsystem and improves the response time of the memory subsystem especially during mixed workloads.

Figure 1:
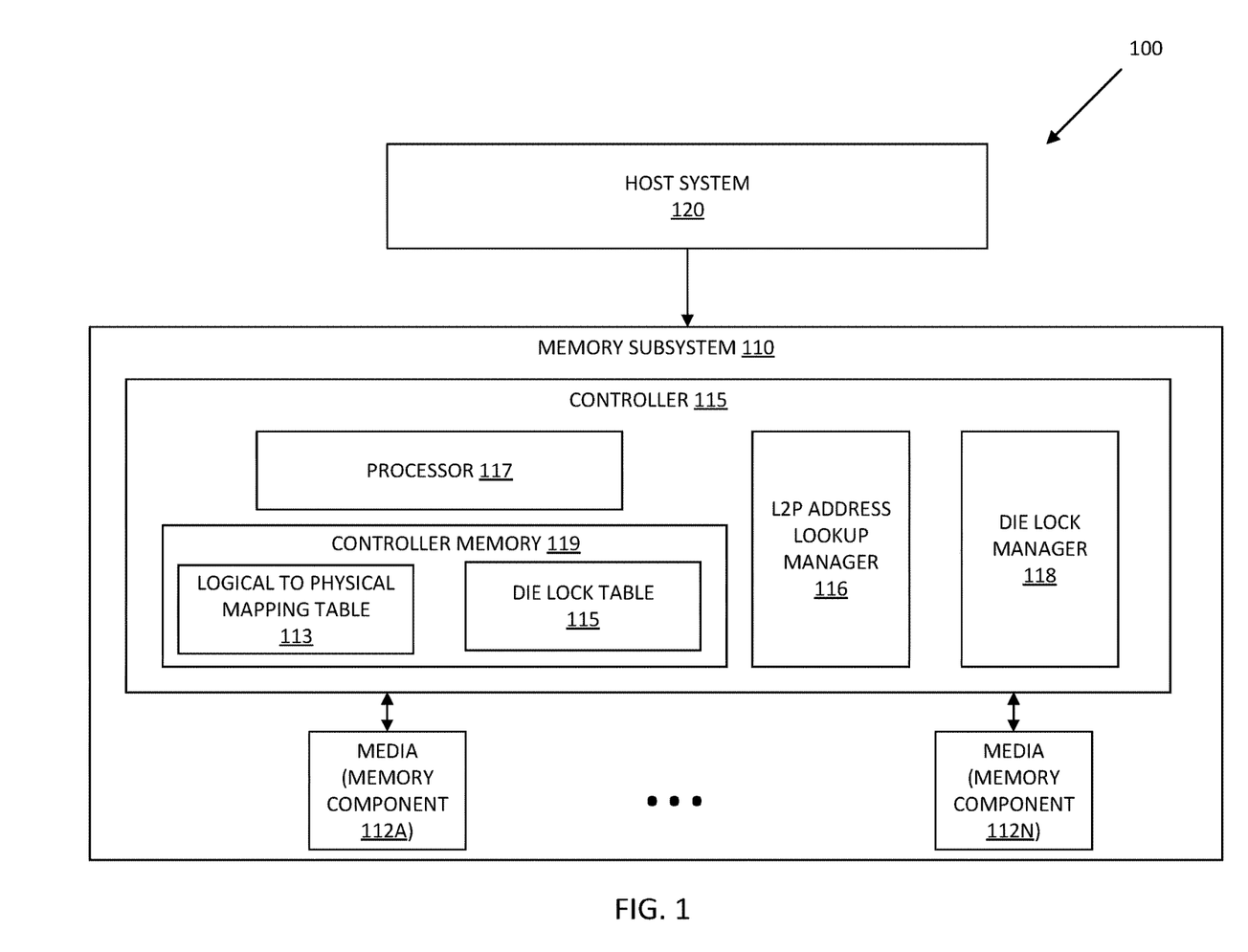
FIG. 1 illustrates an example computing environment that includes a memory subsystem in accordance with some embodiments of the present disclosure.

FIG. 1 illustrates an example computing environment 100 that includes a memory subsystem 110 in accordance with some embodiments of the present disclosure. The memory subsystem 110 can include media, such as memory components (memory devices 112A-112N). The memory components 112A to 112N can be volatile memory components, non-volatile memory components, or a combination of such. In some embodiments, the memory subsystem is a storage system. An example of a storage system is an SSD. In some embodiments, the memory subsystem 110 is a hybrid memory/storage subsystem. In general, the computing environment 100 can include a host system 120 that uses the memory subsystem 110. For example, the host system 120 can write data to the memory subsystem 110 and read data from the memory subsystem 110.

The host system 120 can be a computing device such as a desktop computer, laptop computer, network server, mobile device, or such computing device that includes a memory and a processing device. The host system 120 can include or be coupled to the memory subsystem 110 so that the host system 120 can read data from or write data to the memory subsystem 110. The host system 120 can be coupled to the memory subsystem 110 via a physical host interface. As used herein, "coupled to" generally refers to a connection between components, which can be an indirect communicative connection or direct communicative connection (e.g., without intervening components), whether wired or wireless, including connections such as electrical, optical, magnetic, etc. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), etc. The physical host interface can be used to transmit data between the host system 120 and the memory subsystem 110. The host system 120 can further utilize an NVM Express (NVMe) interface to access the memory components 112A to 112N when the memory subsystem 110 is coupled with the host system 120 by the PCIe interface. The physical host interface can provide an interface for passing control, address, data, and other signals between the memory subsystem 110 and the host system 120. While computing environment 100 is illustrated with a single host system 120, some embodiments include multiple host systems 120 coupled the memory subsystem 110.

The memory components 112A-112N can include any combination of the different types of non-volatile memory components and/or volatile memory components. An example of non-volatile memory components includes negative-and (NAND) type flash memory. For example, each memory component 112 can be embodied in a NAND die. While embodiments described below refer to memory components 112 in a die-level granularity, in other embodiments, a memory component 112 can include only a portion of a die or a memory component 112 can include multiple dice. Each of the memory components 112A-112N can include one or more arrays of memory cells such as single level cells (SLCs) or multi-level cells (MLCs) (e.g., triple level cells (TLCs) or quad-level cells (QLCs)). In some embodiments, a particular memory component can include both an SLC portion and an MLC portion of memory cells. Each of the memory cells can store one or more bits of data (e.g., blocks) used by the host system 120. Although non-volatile memory components such as NAND type flash memory are described, the memory components 112A-112N can be based on any other type of memory such as a volatile memory. In some embodiments, the memory components 112A-112N can be, but are not limited to, random access memory (RAM), read-only memory (ROM), dynamic random access memory (DRAM), synchronous dynamic random access memory (SDRAM), phase change memory (PCM), magneto random access memory (MRAM), negative-or (NOR) flash memory, electrically erasable programmable read-only memory (EEPROM), and a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. Furthermore, the memory cells of the memory components 112A-112N can be grouped as memory pages or blocks that can refer to a unit of the memory component used to store data.

The memory system controller 115 (hereinafter referred to as "controller") can communicate with the memory components 112A-112N to perform operations such as reading data, writing data, or erasing data at the memory components 112A-112N and other such operations. The controller 115 can include hardware such as one or more integrated circuits and/or discrete components, a buffer memory, or a combination thereof. The controller 115 can be a microcontroller, special purpose logic circuitry (e.g., a field programmable gate array (FPGA), an application specific integrated circuit (ASIC), etc.), or another suitable processor. The controller 115 can include a processor (processing device) 117 configured to execute instructions stored in local memory 119. In the illustrated example, the local memory 119 of the controller 115 includes an embedded memory configured to store instructions for performing various processes, operations, logic flows, and routines that control operation of the memory subsystem 110, including handling communications between the memory subsystem 110 and the host system 120. In some embodiments, the local memory 119 can include memory registers storing memory pointers, fetched data, etc. The local memory 119 can also include read-only memory (ROM) for storing micro-code.

While the example memory subsystem 110 in FIG. 1 has been illustrated as including the controller 115, in another embodiment of the present disclosure, a memory subsystem 110 may not include a controller 115, and may instead rely upon external control (e.g., provided by an external host, or by a processor or controller separate from the memory subsystem).

In general, the controller 115 can receive commands or operations from the host system 120 and can convert the commands or operations into instructions or appropriate commands to achieve the desired access to the memory components 112A to 112N. The controller 115 can be responsible for other operations such as wear leveling operations, garbage collection operations, error detection and error-correcting code (ECC) operations, encryption operations, caching operations, and address translations between a logical block address and a physical block address that are associated with the memory components 112A to 112N. The controller 115 can further include host interface circuitry to communicate with the host system 120 via the physical host interface. The host interface circuitry can convert the commands received from the host system into command instructions to access the memory components 112A to 112N as well as convert responses associated with the memory components 112A to 112N into information for the host system 120.

The memory subsystem 110 can also include additional circuitry or components that are not illustrated. In some embodiments, the memory subsystem 110 can include a cache or buffer (e.g., DRAM) and address circuitry (e.g., a row decoder and a column decoder) that can receive an address from the controller 115 and decode the address to access the memory components 112A to 112N.

A variety of data organization schemes can be employed to aid in the management of the memory components 112A-112N. For instance, as noted above, in some embodiments, the memory cells of the memory components 112A-112N can be grouped into memory pages. In some embodiments, the memory pages are grouped into memory blocks ("blocks"). A block is a unit of the memory component used to store data. These blocks can further be combined to form planes and groups of one or more planes form dies. A die can contain a single plane full of blocks or they may feature multiple planes that have been linked together. Thus, in certain embodiments, a memory component 112 may comprise one or more memory pages that can be grouped together to form one or more blocks and one or more blocks may be combined to form a die.

The memory subsystem 110 includes a logical to physical (L2P) address lookup manager 116 and a die lock manager 118. In certain embodiments, the L2P address lookup manager 116 receives a logical address (e.g., within a read/write command from the host system 120) and determines a die of media (i.e., memory components 112A-112N) on which to execute the command. In some instances, the L2P address lookup manager 116 is a component of a Flash Translation Layer (FTL) (not shown in FIG. 1) residing in the controller 115. The L2P address lookup manager 116 uses metadata (e.g., a logical address) in the read/write command received from the host system 120 to identify a physical address in a memory component (e.g., 112A to 112N) in which the command will be executed. In an embodiment, the physical address includes or otherwise maps to a die index of the media (memory components 112A to 112N). For example, L2P address lookup manager 116 maintains mappings between logical and physical addresses using a logical to physical mapping table 113 stored in the controller memory 119 of the memory subsystem 110. The mapping table 113 can also be persisted in one of the memory components 112A-112N and can be restored by the controller 115 to the controller memory 119, for example, in case of a power failure. The L2P address lookup manager 116 provides the die index to the die lock manager 118. In certain embodiments, the L2P address lookup manager 116 can make use of the NVMe directive command (used by the host system 120 to accesses the memory components 112A to 112N) to report the die index of the die to the die lock manager 118.

The die lock manager 118 receives the die index from the L2P address lookup manager 116 and performs a set of operations for the execution of the read/write. For example, it manages locks on the die in order to perform the requested operation, e.g., as described in greater detail below with reference to FIGS. 2-5.

In certain embodiments, in the management of die locks, the die lock manager 118 performs a check to determine if the die is already locked for an ongoing read or write operation. For instance, the die lock manager 118 can refer to a die lock table 115 stored in the controller memory 119 of the controller 115 to perform this check. The die lock table 115 stores lock information associated with dies of memory components 112A to 112N. The lock information may include, for a particular die, whether the die has been locked for a read operation or a write operation and a lock count associated with one or both type of lock on the die. Additional details regarding the die lock table 115 are described in FIG. 2.

In some embodiments, the controller 115 includes at least a portion of the L2P manager 116 and the die lock manager 118. For example, the controller 115 can include a processor 117 (processing device) configured to execute instructions stored in local memory 119 for performing the operations described herein. In some embodiments, the L2P address lookup manager 116 and the die lock manager 118 are part of the host system 110, an application, or an operating system. Further details with regard to the operations of the L2P address lookup manager 116 and the die lock manager 118 are described below.

Figure 2:
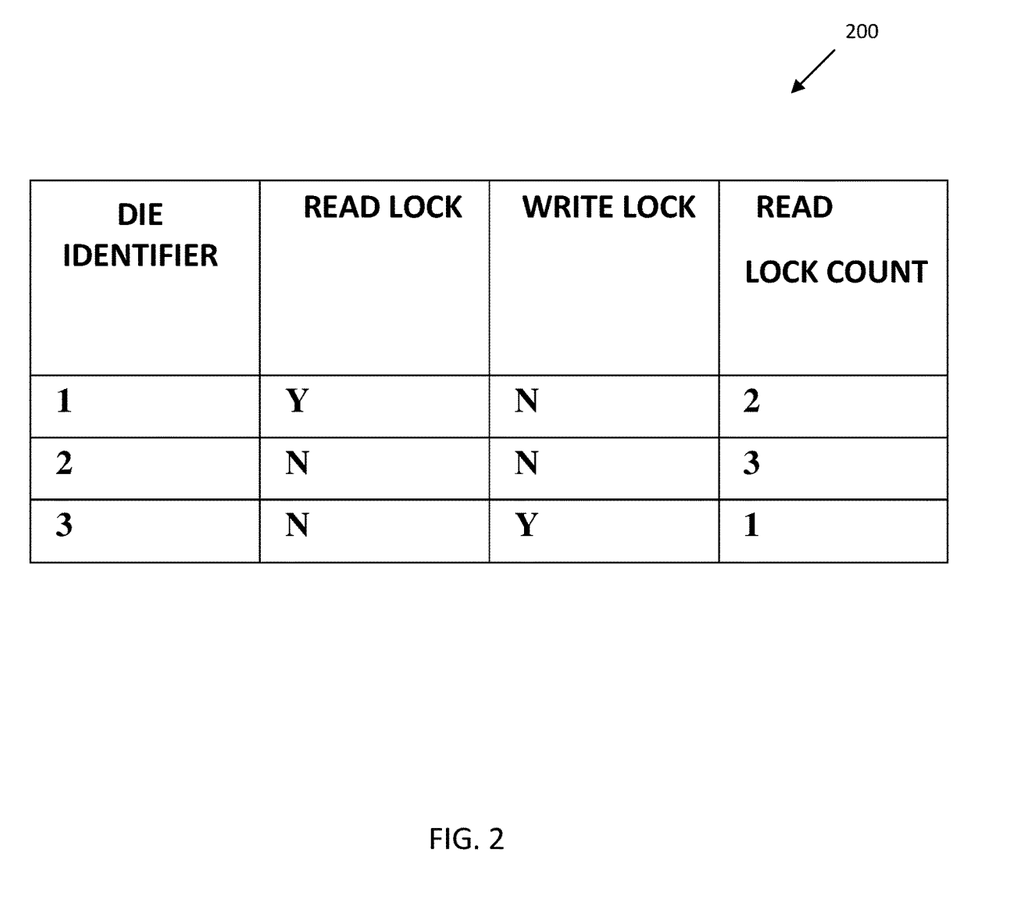
FIG. 2 is an exemplary illustration of the information stored in a die lock data structure, in accordance with an embodiment of the present disclosure

FIG. 2 is an exemplary illustration of the information stored in a die lock table 200, in accordance with an embodiment of the present disclosure. For example, the die lock table 200 is one implementation of the die lock table 115 shown in FIG. 1. The die lock table 200 stores lock information associated with each die (or memory component 112). The lock information can include, for a particular die, a die identifier for the die, whether the die has been locked for a read operation, whether the die has been locked for a write operation, and a read lock count associated with the die. In one embodiment, the read lock count represents a number of read operations executed and/or queued to be executed during a single read lock on a die. In another embodiment, the read lock count represents an amount of time a read lock is maintained on a die (e.g., a timestamp the read lock was taken). While not illustrated, in some embodiments, the die lock table 200 also stores a write lock count associated with the die. For example, read lock and write lock values can be represented by a single bit, using a 0 for unlocked and 1 for locked, or vice versa. The die index and read lock count can be implemented by multiple bits, as dictated by the number of dice and the upper threshold for the read lock count. Further details regarding the operations performed by the L2P address lookup manager 116 and die lock manager 118 use of the die lock table 200 are described in relation to FIGS. 3-5 below.

Figure 3:
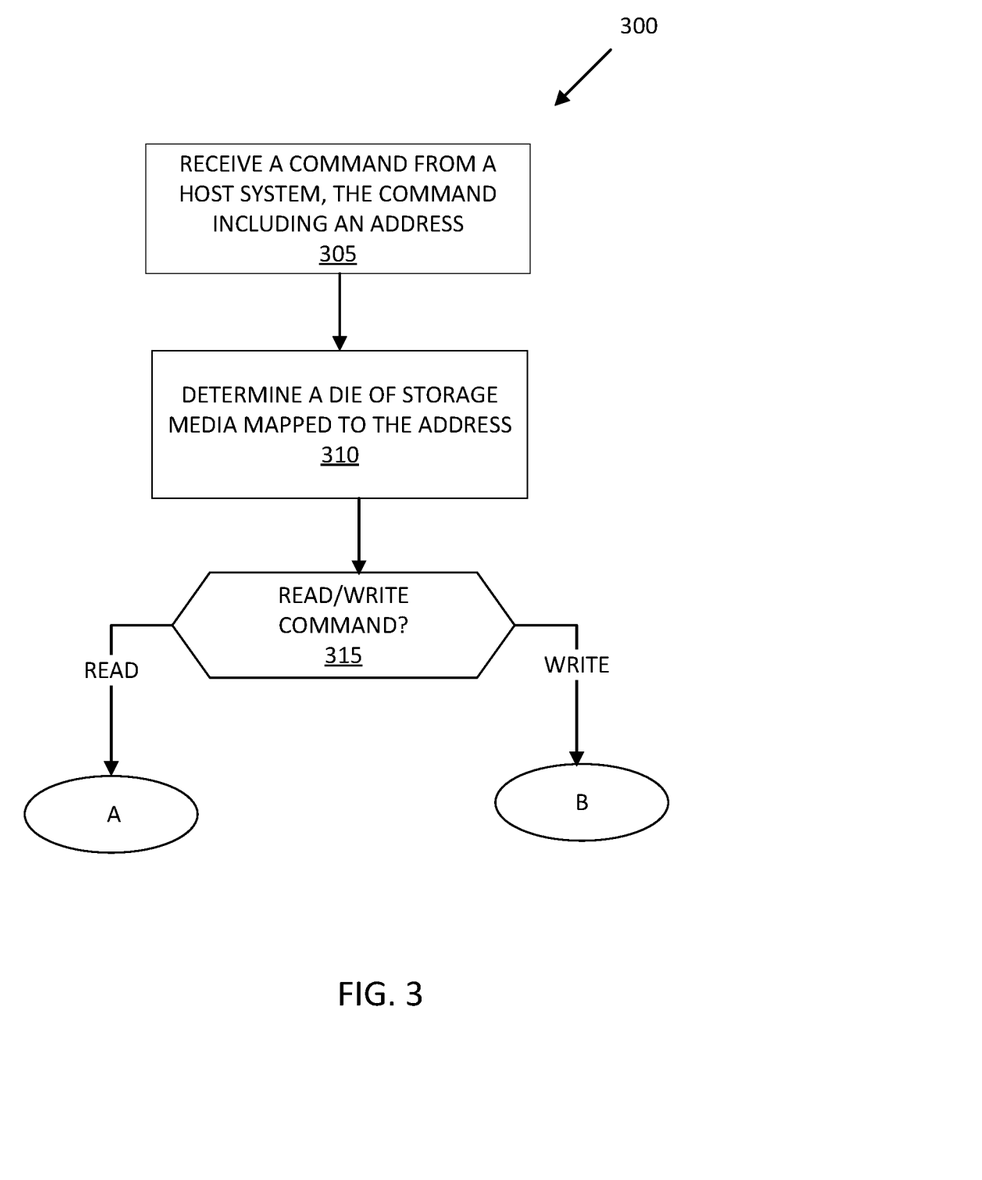
FIG. 3 is a flow diagram of an example method of die lock management, in accordance with some embodiments of the present disclosure.

FIG. 3 is a flow diagram of an example method 300 performed by a processing device in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by the controller 115 via L2P address lookup manager 116 and die lock manager 118. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing device receives a command from the host system 120. A read or write command received from the host system 120 includes an address. As described in FIG. 1, the address may include (or otherwise correspond to) a logical address for data stored in a memory component 112 (e.g., a die). In certain embodiments, a garbage collection process, a wear leveling process, or a read refresh process also triggers a command that may be received by the processing device at operation 305.

At operation 310, the processing device determines a die (i.e., a die identifier) of the storage mapped to the address. For example, L2P address lookup manager 116 uses the logical to physical mapping table 113 to map the received logical address to a physical address. In one embodiment, the physical address includes (or further maps to) an identifier for a die.

At operation 315, the processing device determines if the command is a read operation or a write operation. If the command corresponds to a read operation, the method 300 proceeds via offpage connector A, as described with reference to FIG. 4. If the command corresponds to a write operation, the method 300 proceeds via offpage connector B, as described with reference to FIG. 5.

Figure 4:
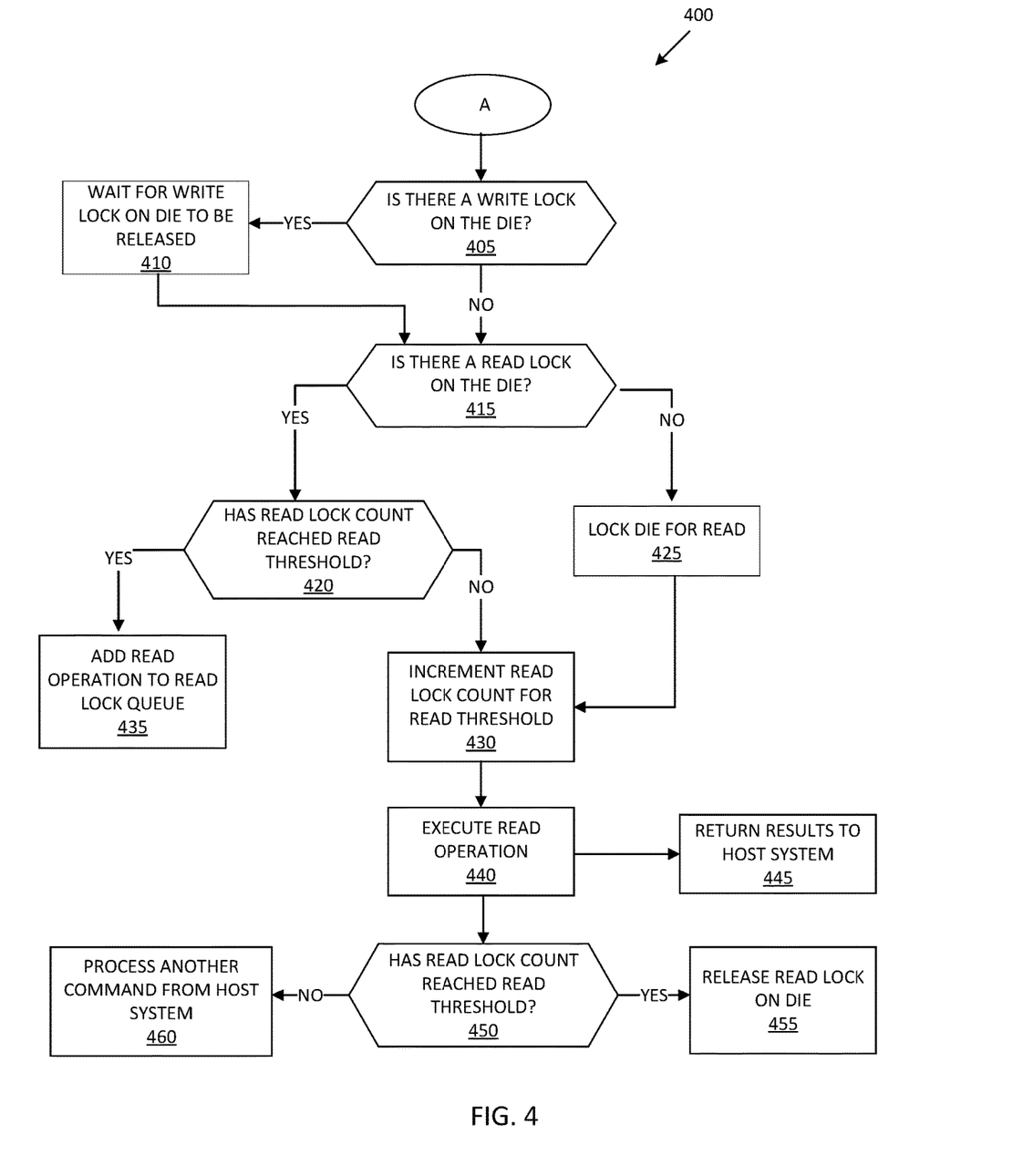
FIG. 4 is a flow diagram of a continuation of the example method of die lock management, in accordance with some embodiments of the present disclosure.

FIG. 4 is a flow diagram of an example method 400 performed by a processing device in accordance with another embodiment of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 400 is performed by the die lock manager 118 of FIG. 1 when it receives a read command. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 405, upon receiving a read command, the processing device determines if the memory component 112 has already been locked for writing (i.e., there is a write lock on the die). For example, the die lock manager 118 uses the die identifier to lookup a write lock state in the die lock table 115. In one embodiment, the write lock state is determined by evaluating a value of a write lock count. For example, a value of zero can be used to represent an unlocked state and a non-zero value can be used to represent a locked state. If there is a write lock on the die, at operation 410, the processing device waits for the write lock to be released before it can execute the read operation. In certain embodiments, the processing device executes multiple write commands when there is a write lock on the die. The processing device increments a write lock count for the die each time a write command is ready to be executed and decrements the write lock count each time the execution of a write command is complete. Similarly, the processing device can increment and decrement a read lock count to implement a read lock on a die.

Upon receiving a read command (for e.g., at operation 405) and determining that there is a write lock on the die, the processing device can suspend a write command that is currently being executed to execute the pending read command. When a write command is suspended, the processing device decrements the write lock count for the die. In another embodiment, the processing device temporarily prevents additional write commands from being added to the write lock and waits for the existing one or more write commands to complete, decrementing the write lock as each write command is completed. When the write lock count on the die reaches zero, in some embodiments, the processing device clears (disables/releases) the write lock on the die to process the incoming read command. After the read operation is executed, the processing device can resume execution of the suspended write command and/or other queued write commands. In some embodiments, prior to executing the write command, the processing device enables the write lock count on the die, e.g., by incrementing the write lock count on the die.

If the die has not been locked for writing or when the write lock is released, at block 415, the processing device determines if the die has been locked for reading (i.e., there is a read lock on the die). For example, the die lock manager 118 uses the die identifier to lookup a read lock state in the die lock table 115.

If there is a read lock on the die, at operation 420, the processing device determines if the read lock count on the die has reached the read threshold associated with the die. In some embodiments, the read threshold is a number of read operations (e.g., 10) that can be executed on the die when there is a read lock on the die. For example, the die lock manager 118 uses the die identifier to lookup a read lock count in the die lock table 115 and compares the read lock count to a read threshold for the read lock. In other embodiments, the read threshold can correspond to a time period when there is a read lock on the die. For example, the die lock manager 118 uses the die identifier to lookup a timestamp (instead of a read lock count) indicating when the read lock was initiated. The die lock manager can then compare the amount of time that has passed since the timestamp against the read threshold time period. If it is determined that the read lock count on the die or corresponding amount of time has reached or exceeded the read threshold, at operation 435, the die lock manager 118 adds the read operation to a read lock queue to be executed at a later point in time. For example, upon completing the read operations that already depend upon the read lock and the release of the read lock (e.g., decrementing the read lock count after the completion of each ready-to-execute read operation until the read lock count returns to zero), the die lock manager 118 can service an incoming write operation or a pending write operation that is in a write lock queue.

By obtaining a read lock on the die and maintaining that read lock up to a read threshold, the die lock manager 118 can ensure that the die is locked to perform a certain number of read operations before executing another operation (such as an incoming write operation) which could potentially be a lengthy operation. This can reduce the latency associated with performing read/write operations during a mixed workload. In an embodiment, the read lock queue and the write lock queue are data structures managed by the die lock manager 118 and stored in the controller memory 119 of the memory subsystem 110. The queues can also be persisted in one of the memory components 112A-112N.

If the die lock manager 118 determines that there is no read lock on the die at operation 415, the die lock manager 118 locks the die for reading at operation 425. If at operation 420, the processing device determines that the read lock count for the die has not reached the read threshold or following locking the die at operation 425, the die lock manager 118 increments the read lock count at operation 430. At operation 440, the processing device executes the read operation at operation 440 and returns the results of the read operation (e.g., to the host system 120) at operation 445.

In certain embodiments, after executing the read operation, the processing device again determines whether the read lock count has reached the read threshold at operation 450. If the read lock count has not reached the read threshold, at operation 460, the processing device processes another read command using the same read lock if needed. If the read lock count on the die has reached or exceeded the read threshold, at operation 455, the processing device waits until the read lock count on the die reaches zero before releasing the read lock on the die.

In certain embodiments, the processing device prioritizes and processes any pending read operations (for e.g., pending read page requests) to be executed on a die prior to processing an incoming read or a write command from a host system (e.g., received at operation 305). In some examples, the pending read operations are stored in the read lock queue managed by the die lock manager 118. If there is an existing write lock on the die, the die lock manager 118 initiates a suspension of a pending write operation, decrements the write lock count on the die and when the write lock count reaches zero, executes the pending read requests from the read queue.

Figure 5:
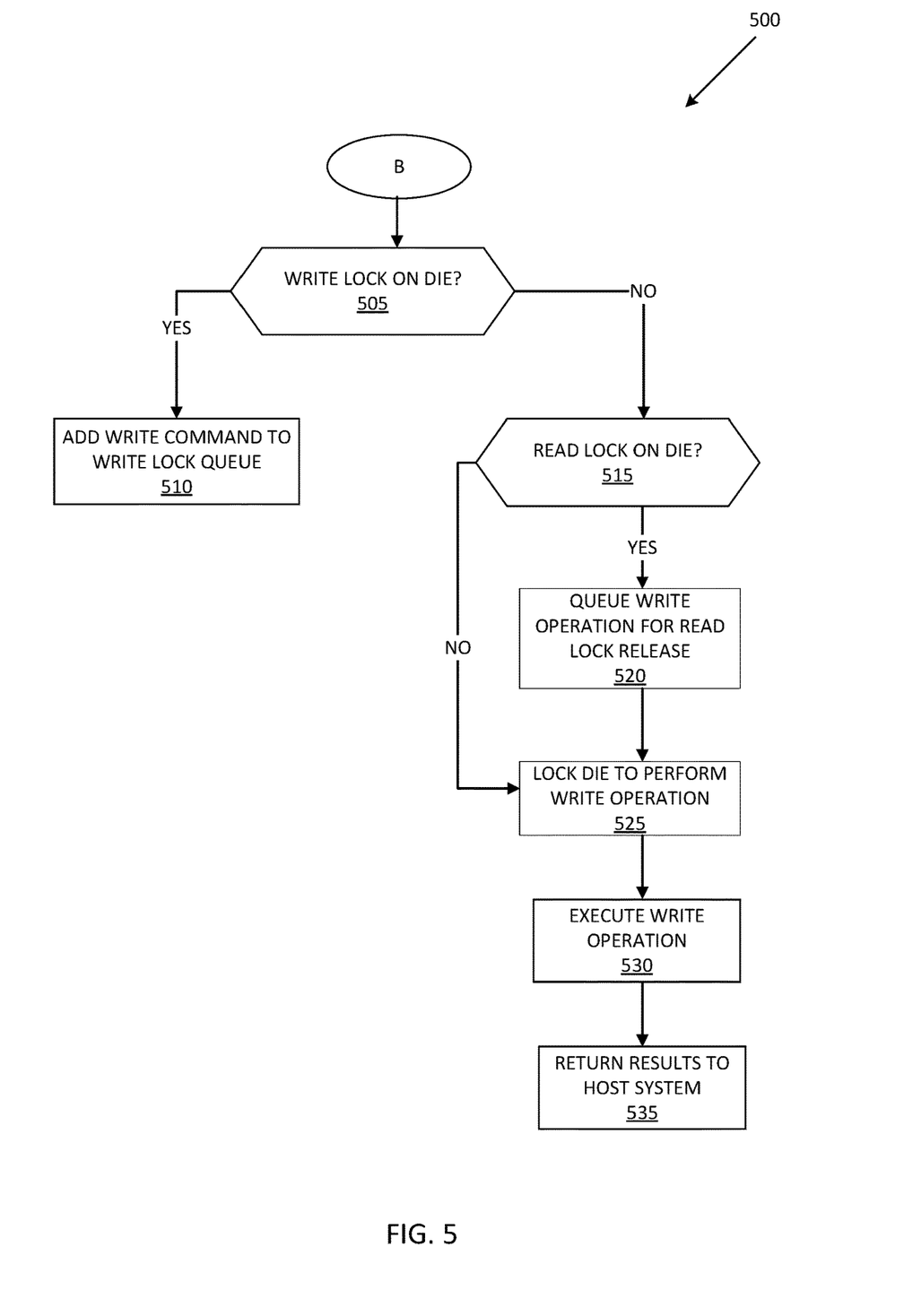
FIG. 5 is a flow diagram of another continuation of the example method of die lock management, in accordance with some embodiments of the present disclosure.

FIG. 5 is a flow diagram of an example method 500 performed by a processing device in accordance with another embodiment of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the die lock manager 118 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 505, upon receiving a write command, the processing device determines if the memory component 112 has already been locked for writing (i.e., there is a write lock on the die). For example, the die lock manager 118 uses the die identifier to lookup a write lock state in the die lock table 115. If there is a write lock on the die, at operation 510, the processing device adds the write command to a write lock queue. As noted above, the processing device can increment the write lock count on the die each time the processing device is ready to execute a write command from the write lock queue (e.g., upon pulling a write command out of the write lock queue). As such, the processing device can process a variety of requests stored in the write lock queue, including host write requests, garbage collection/wear leveling write requests, erase requests, or relocation requests.

If the die has not been locked for writing, at operation 515, the processing device determines if the die has been locked for reading (i.e., there is a read lock on the die). For example, the die lock manager 118 uses the die identifier to lookup a read lock state in the die lock table 115. If there is no read lock on the die, the processing device locks the die to perform the write operation at operation 525. At operation 530, the processing device executes the write operation and, at operation 535, returns the results of the write operation (e.g., to the host system 120).

If there is a read lock on the die, at operation 520, the processing device adds the write operation to the write lock queue and waits for the read lock on the die to be released. When the read lock on the die is released, the processing device locks the die to perform the write operation at operation 530 and, at operation 535 returns the results of the write operation (e.g., to the host system 120).

Figure 6:
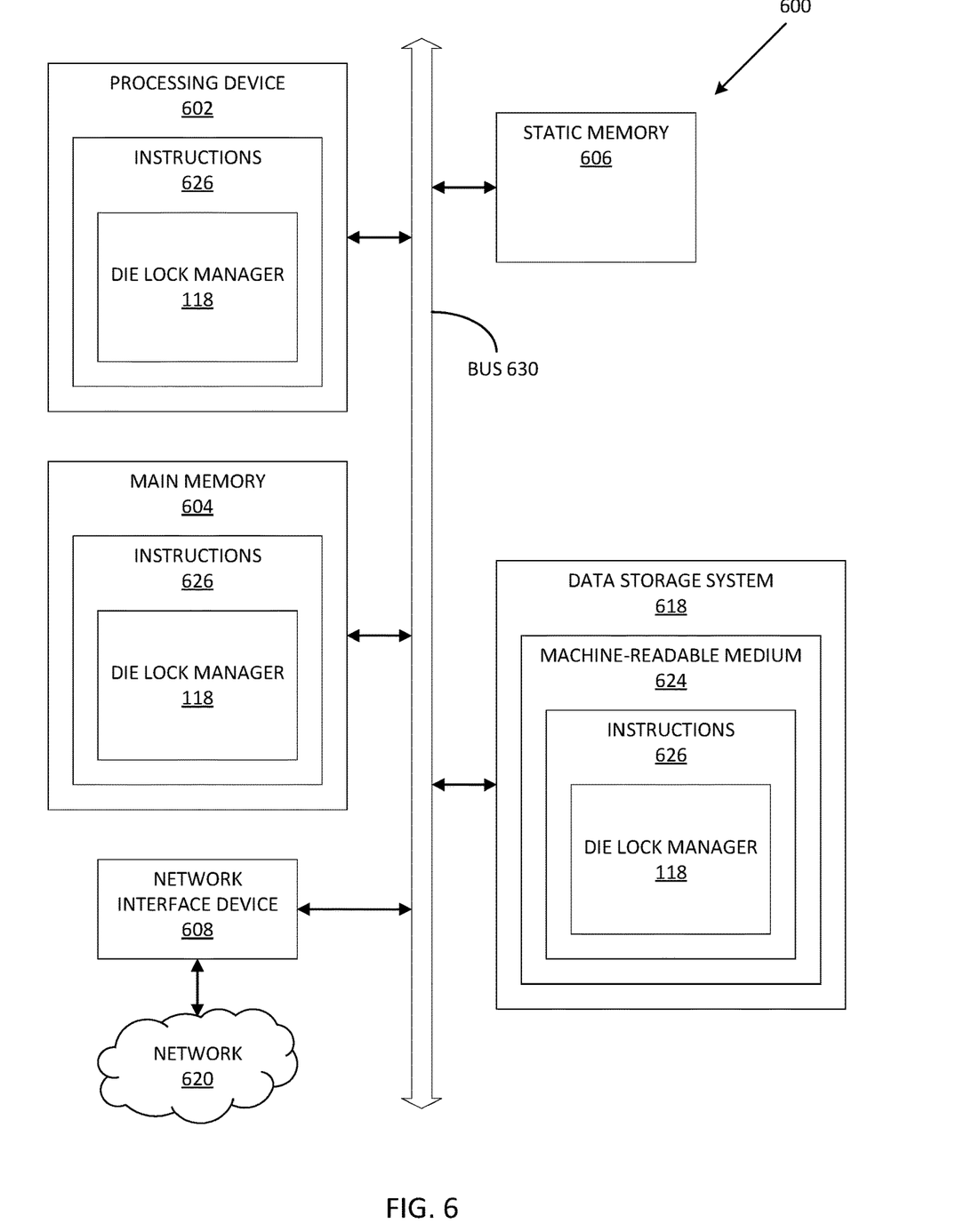
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory subsystem (e.g., the memory subsystem 110 of FIG. 1 or can be used to perform the operations of a controller (e.g., to execute an operating system to perform operations corresponding to the die lock manager 118 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory subsystem 110 of FIG. 1.

In one embodiment, the instructions 626 include instructions to implement functionality corresponding to a die lock manager 118 of FIG. 1. While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the controller 115, may carry out the computer-implemented methods described in FIG. 3, FIG. 4, and FIG. 5 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
receiving a first command from a host system, the first command corresponding to a first read operation including a first address;
determining a memory component of media mapped to the first address;
determining that there is a read lock on the memory component;
determining that a count of read operations dependent on the read lock has reached a read threshold, wherein the read threshold corresponds to a number of read operations that can be executed on the memory component when there is a read lock on the memory component;
adding the first read operation to a read lock queue in response to the count of read operations reaching the read threshold; and
executing a first write operation prior to the first read operation in response to the count of read operations reaching the read threshold.

2. The method of claim 1, further comprising releasing the read lock on the memory component in response to the count of read operations reaching the read threshold.

3. The method of claim 1, further comprising:
receiving a second command, the second command corresponding to a second read operation including a second address;
determining that the memory component of media is mapped to the second address;
determining that there is the read lock on the memory component;
determining that the count of read operations dependent on the read lock has not reached the read threshold; and
in response to determining that the count of read operations has not reached the read threshold, executing the second read operation.

4. The method of claim 1, further comprising:
receiving a third command, the third command corresponding to a second write operation, the second write operation including a third address;
determining that the memory component of media is mapped to the third address;
determining that there is no read lock on the memory component;
in response to determining that there is not read lock on the memory component, locking the memory component to obtain a write lock on the memory component; and
executing the second write operation.

5. The method of claim 1, further comprising:
receiving a third command, the third command corresponding to a second write operation, the second write operation including a third address;
determining that the memory component of media is mapped to the third address;
determining that there is the read lock on the memory component;
adding the second write operation to a write lock queue;
determining that the read lock on the memory component has been released;
obtaining a write lock on the memory component; and
executing the second write operation.

6. A non-transitory computer-readable storage medium comprising instructions that, when executed by a processing device, cause the processing device to:
receive a first command, the first command corresponding to a first read operation including a first address;
determine a memory component of media mapped to the first address;
determine that there is a read lock on the memory component;
determine that a count of read operations dependent on the read lock has reached a read threshold, wherein the read threshold corresponds to a number of read operations that can be executed on the memory component when there is a read lock on the memory component;
add the first read operation to a read lock queue in response to the count of read operations reaching the read threshold; and execute a first write operation prior to the first read operation in response to the count of read operations reaching the read threshold.

7. The non-transitory computer-readable storage medium of claim 6, wherein the processing device is further configured to release the read lock on the memory component in response to the count of read operations reaching the read threshold.

8. The non-transitory computer-readable storage medium of claim 6, wherein the processing device is further configured to:
receive a second command, the second command corresponding to a second read operation including a second address;
determine that the memory component of media is mapped to the second address;
determine that there is the read lock on the memory component;
determine that the count of read operations dependent on the read lock has not reached the read threshold; and
in response to determining that the count of read operations has not reached the read threshold, executing the second read operation.

9. The non-transitory computer-readable storage medium of claim 6, wherein the processing device is further configured to:
receive a third command, the third command corresponding to a second write operation, the second write operation including a third address;
determine that the memory component of media is mapped to the third address;
determine that there is no read lock on the memory component;
in response to determining that there is not read lock on the memory component, lock the memory component to obtain a write lock on the memory component; and
execute the second write operation.

10. The non-transitory computer-readable storage medium of claim 6, wherein the processing device is further configured to:
receive a third command, the third command corresponding to a second write operation, the second write operation including a third address;
determine that the memory component of media is mapped to the third address;
determine that there is the read lock on the memory component;
add the second write operation to a write lock queue;
determine that the read lock on the memory component has been released;
obtain a write lock on the memory component; and
execute the second write operation.

11. A system comprising:
a memory component; and
a processing device, operatively coupled with the memory component, to:
receive a first command, the first command corresponding to a first read operation including a first address;
determine a memory component of media mapped to the first address;
determine that there is a read lock on the memory component;
determine that a count of read operations dependent on the read lock has reached a read threshold, wherein the read threshold corresponds to a number of read operations that can be executed on the memory component when there is a read lock on the memory component;
add the first read operation to a read lock queue in response to the count of read operations reaching the read threshold; and
execute a first write operation prior to the first read operation in response to the count of read operations reaching the read threshold.

12. The system of claim 11, wherein the processing device is further configured to release the read lock on the memory component in response to the count of read operations reaching the read threshold.

13. The system of claim 11, wherein the processing device is further configured to:
receive a second command, the second command corresponding to a second read operation including a second address;
determine that the memory component of media is mapped to the second address;
determine that there is the read lock on the memory component;
determine that the count of read operations dependent on the read lock has not reached the read threshold; and
in response to determining that the count of read operations has not reached the read threshold, executing the second read operation.

14. The system of claim 11, wherein the processing device is further configured to:
receive a third command, the third command corresponding to a second write operation, the second write operation including a third address;
determine that the memory component of media is mapped to the third address;
determine that there is no read lock on the memory component;
in response to determining that there is not read lock on the memory component, lock the memory component to obtain a write lock on the memory component; and
execute the second write operation.

15. The method of claim 1, further comprising:
receiving a second command, the second command corresponding to a second read operation including a second address;
determining that the memory component of media is mapped to the second address;
determining that there is the read lock on the memory component;
determining that the count of read operations dependent on the read lock has not reached the read threshold; and
in response to determining that the count of read operations has not reached the read threshold, incrementing the count of read operations dependent upon the read lock.

16. The non-transitory computer-readable storage medium of claim 6, wherein the processing device is further configured to:
receive a second command, the second command corresponding to a second read operation including a second address;
determine that the memory component of media is mapped to the second address;
determine that there is the read lock on the memory component;
determine that the count of read operations dependent on the read lock has not reached the read threshold; and in response to determining that the count of read operations has not reached the read threshold, increment the count of read operations dependent upon the read lock.

17. The system of claim 11, wherein the processing device is further configured to:
receive a second command, the second command corresponding to a second read operation including a second address;
determine that the memory component of media is mapped to the second address;
determine that there is the read lock on the memory component;
determine that the count of read operations dependent on the read lock has not reached the read threshold; and
in response to determining that the count of read operations has not reached the read threshold, increment the count of read operations dependent upon the read lock.

* * * * *